No. 697,382. Patented Apr. 8, 1902.
G. W. MAXWELL.
MECHANICAL DIRECTORY.
(Application filed Nov. 9, 1901.)
(No Model.) 6 Sheets—Sheet 1.

Fig. 1.

WITNESSES: INVENTOR
George W. Maxwell,
BY Dodge and Sons,
ATTORNEYS.

No. 697,382. Patented Apr. 8, 1902.
G. W. MAXWELL.
MECHANICAL DIRECTORY.
(Application filed Nov. 9, 1901.)
(No Model.) 6 Sheets—Sheet 4.

Fig. 4.

WITNESSES:

INVENTOR
George W. Maxwell,
BY
ATTORNEYS.

No. 697,382. Patented Apr. 8, 1902.
G. W. MAXWELL.
MECHANICAL DIRECTORY.
(Application filed Nov. 9, 1901.)
(No Model.) 6 Sheets—Sheet 5.

Fig. 5.

WITNESSES:

INVENTOR
George W. Maxwell,
BY Dodge and Sons,
ATTORNEYS.

No. 697,382. Patented Apr. 8, 1902.
G. W. MAXWELL.
MECHANICAL DIRECTORY.
(Application filed Nov. 9, 1901.)
(No Model.) 6 Sheets—Sheet 6.

WITNESSES:

INVENTOR
George W. Maxwell,
BY Dodge and Sons,
ATTORNEYS.

UNITED STATES PATENT OFFICE.

GEORGE W. MAXWELL, OF LOS ANGELES, CALIFORNIA.

MECHANICAL DIRECTORY.

SPECIFICATION forming part of Letters Patent No. 697,382, dated April 8, 1902.

Application filed November 9, 1901. Serial No. 81,722. (No model.)

*To all whom it may concern:*

Be it known that I, GEORGE W. MAXWELL, a citizen of the United States, residing at Los Angeles, in the county of Los Angeles and State of California, have invented certain new and useful Improvements in Mechanical Directories, of which the following is a specification.

My present invention pertains to improvements in mechanical directories, the construction and advantages of which will be hereinafter set forth, reference being had to the annexed drawings, wherein—

Fig. 6, a similar view illustrating the mechanism employed for automatically causing a reverse movement or traverse of the web-winding devices, and Fig. 7 a top plan view of the mechanism shown in Fig. 6.

In my pending application, Serial No. 737,688, filed on or about the 20th day of November, 1899, I have shown and claimed, among other things, a directory strip or web, an index-strip, means for causing them to travel in proper relation one to the other, and also means for causing a reverse movement of the webs at any desired time and at any point in the length of their travel.

The present invention is to be considered as an improvement upon said structure and has for its objects the provision of a superior means for traversing the bands or webs, whereby they may be moved fast or slow and in either direction, as desired, and the provision of mechanism for causing the automatic reversal of travel of the web when it has been entirely or nearly wound upon either one of the rolls.

A still further object of the invention resides in the provision of a constantly-driven power-shaft which may be thrown into operative connection with the belt-traversing devices simply by the movement of a controlling lever or handle, whereby the belts may be caused to move in one or the other direction at a high or slow speed and finally brought to rest when the desired name or information is brought to view. The advantages of a device embodying these features are manifest and, with further details of the invention, will be hereinafter set forth.

A suitable casing or cabinet A is provided, having a main-directory inspection-opening 1, an index-opening 2, a supplement-opening 3, and two other openings 4 and 5, which in the present instance may be termed the "classified-directory" opening and the "street-directory" opening. The front of the casing will preferably be formed of a plate of glass having its inner face or surface painted over except at those places where the inspection-openings are formed. Secured within the casing is a base-plate B, upon which is mounted a pair of vertically-disposed plates or columns C, which form the support for the web-winding rollers as well as for the idlers, to be hereinafter referred to.

Figure 1:
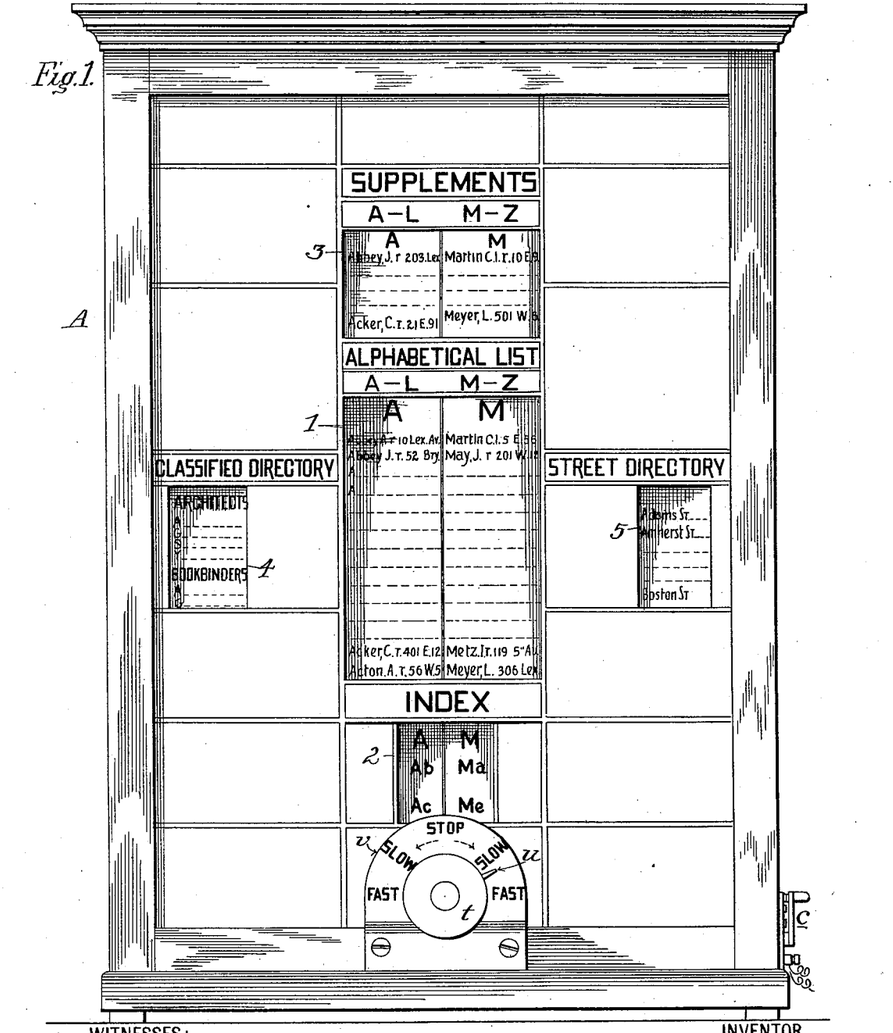
Figure 1 is a front face view of the directory.

D D' denote the main-web-winding shafts or rolls, having attached thereto webs E E', said webs or bands being so secured to the rolls that their adjacent edges are in approximate contact. These webs pass over idle rolls F F', which are so mounted in the plates C that they properly position the web before the inspection-opening 1. These webs E E' may be termed the "main directory-webs" and are designed to carry the permanent list of names and addresses, web E carrying, for instance, the names from A to L, while web E' carries those from M to Z. A second pair of rollers G G', mounted on shafts H H', carry webs I I', which passing over suitable idle rolls appear opposite the opening 3. These webs, as indicated in Fig. 1, carry the supplements, additions, or corrections which it may be necessary to insert or place upon the web from time to time.

Motion is imparted to the shafts H H' by means of belts or chains J J', passing, respectively, about sprockets mounted on the shafts D D', and similar sprockets carried by shafts H H'. As will be seen upon reference to Figs. 2, 3, and 4, the sprockets are so proportioned that the upper or supplement webs will travel at a speed less than that of the main index-webs, the arrangement being such that the speeds are approximately proportionate to the space occupied by the names under each letter of the alphabet.

A third pair of shafts K K' is mounted in the uprights or standards C C, near the lower end thereof, said shafts having attached thereto a pair of webs or bands L L', hereinafter denominated as the "index-webs." By passing over suitable idle rolls M M' these webs are brought into position with reference to the inspection-opening 2. A worm N, carried by shaft D', imparts motion to a counter-shaft O, which motion drives shaft K. By the employment of an intermediate gear P shaft K' is also rotated, but in a direction reverse to that of shaft K. As in the case of the supplement-webs, the index-webs are moved slower than the main directory webs or bands, the relative speed of travel of said webs being properly maintained by the employment of gearing such as shown in the drawings.

Figure 2:
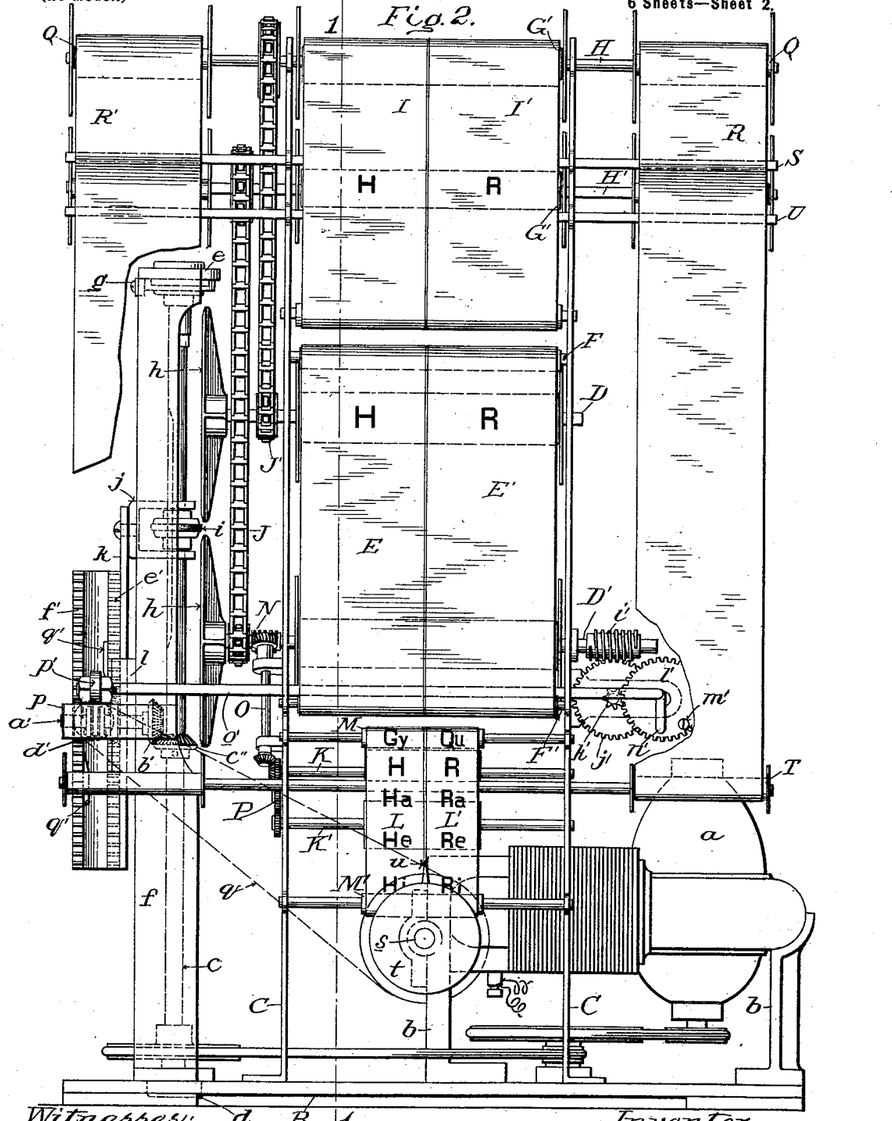
Fig. 2, a similar view of the operative mechanism, the casing being removed.

Shafts H H' are extended outward beyond the uprights or columns C, as best indicated in Fig. 2, and each of said projecting ends carries a spool or roll Q. A web or band R is attached to the rolls on the right, said web passing outwardly from the upper roll over a bar S, thence down past inspection-opening 5, around idle roll T, and back over idle roll U to the lower spool Q. This web or band is designed to be employed as a street-directory, though of course, as will be readily understood, it may contain or carry any desired matter.

The spools Q upon the left of the apparatus carry a web or band R', and this web traverses a similar course to that outlined for web or band R, passing, however, by the inspection-opening 4. In the illustrated form the web is to be employed as a business-directory. Said webs R and R' will travel at the same speed as the supplement-webs.

Figure 3:
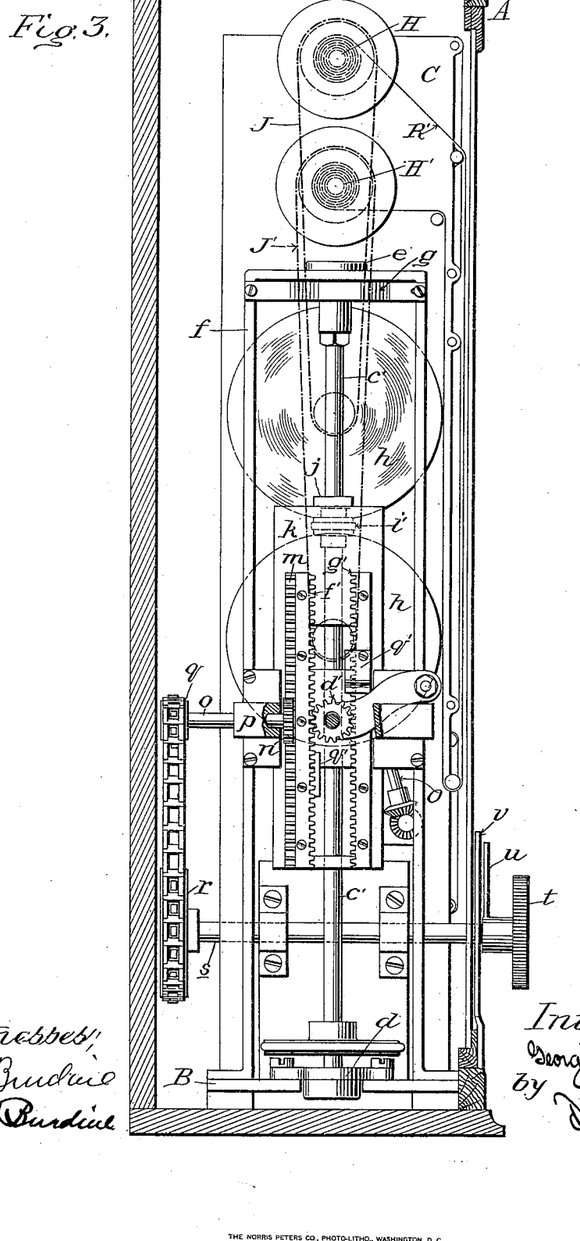
Fig. 3, an end elevation, the casing being shown in section.
Figure 4:
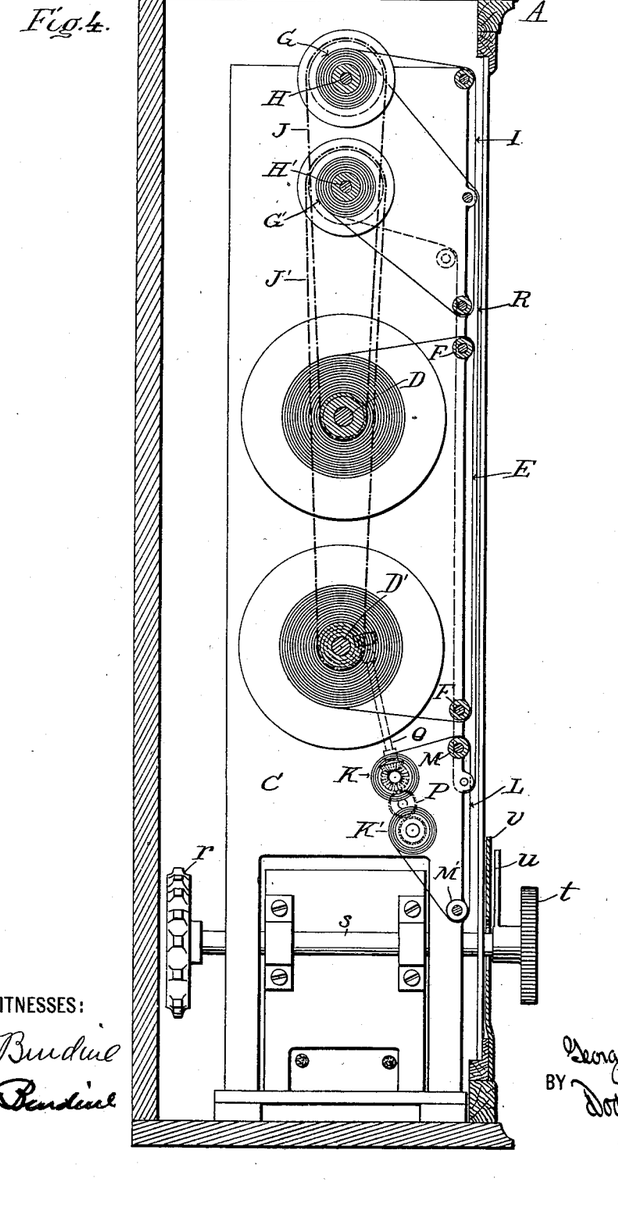
Fig. 4, a vertical sectional view on the line 1 1 of Fig. 2.
Figure 5:
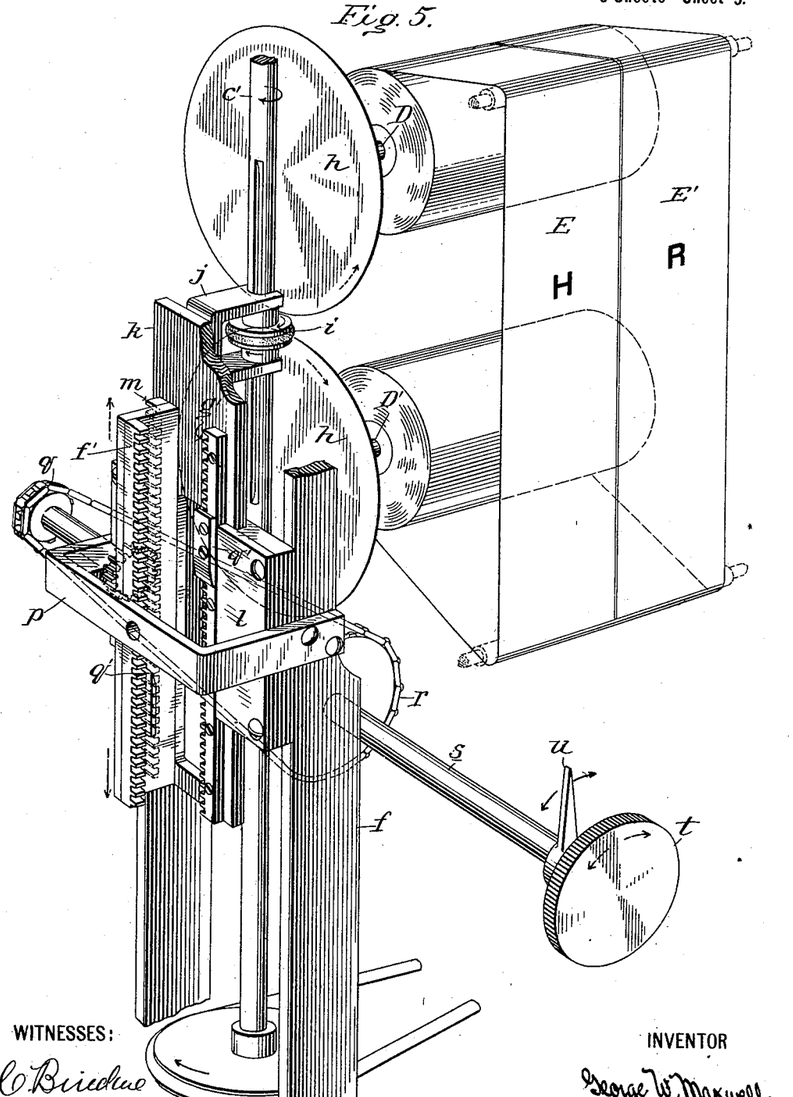
Fig. 5, a perspective view showing in detail the mechanism for controlling the direction of movement and speed of travel of the webs or bands, other parts being omitted.

The driving mechanism will now be described, reference being had particularly to Figs. 2, 3, and 5. An electric motor $a$ is preferably employed for driving the mechanism, and, as illustrated, is located within the casing, being supported by suitable posts $b$, extending up from the base-plate B. While it is designed to keep the motor in constant motion, a switch $c$, Fig. 1, may be employed, if desired, to control said motor. Upon the opposite side of the apparatus from the motor is a shaft $c'$, the lower end of which is mounted in a suitable bearing $d$, while the upper end of said shaft finds its support in a bearing $e$, which bearing is mounted in the upper end of a frame or supporting member $f$. The upper bearing $e$ will be so made that it may have a slight movement toward and from the vertical position, and a spring $g$, Figs. 2 and 3, serves to force the bearing toward column C. Motion is imparted to the shaft $c'$ by belts and pulleys mounted intermediate the shaft and the motor, as best illustrated in Fig. 2. Each of the shafts D D' has mounted upon it, adjacent to the vertically-disposed shaft $c'$, a disk or plate $h$, and the shaft $c'$ has mounted thereon a friction wheel or pulley $i$. Said pulley or wheel is feathered to the shaft $c'$, so that it may be moved longitudinally thereof to bring it into contact with either of the disks $h$ or to a position intermediate the same, as best shown in Fig. 2. The disk or wheel $i$ is held in its position by a U-shaped member or yoke $j$, which is carried by the upper end of a sliding frame $k$, said frame being mounted in suitable bearings formed in a cross plate or bar $l$, secured to the vertical post or frame $f$. To one side of said sliding frame there is secured a rack $m$, with which there meshes a pinion $n$, mounted on the inner end of a shaft $o$, said shaft being carried by a bearing formed in or secured to a bracket $p$, which is likewise secured to the upright frame or member $f$. The outer end of the shaft $o$ is provided with a sprocket-wheel, about which a chain $q$ passes, said chain in turn passing about a somewhat larger sprocket $r$, carried on the end of a shaft $s$, which extends forwardly to the outside of the casing. The outer end of the shaft is provided with a milled head or knob $t$ and a pointer $u$, the pointer working over a dial or indicator $v$, which has the notations, as shown in Fig. 1—to wit, the word "Stop" at the upper portion thereof, and the words "Slow" and "Fast," in the order named, upon each side of the word "Stop." The parts are so proportioned and arranged that when the pointer stands in line with the word "Stop" the parts are in the position indicated in Figs. 2, 3, and 5—that is to say, the friction disk or wheel $i$ will be moved to position where it is not in contact with either of the disks $h$. If the knob $t$ is turned to the right, as shown in Fig. 1, it will turn the shaft $s$ and through the sprocket-chain connection turn shaft $o$, rotating pinion $n$, and, acting through rack $m$, lower the frame $j$, carrying the friction disk or wheel $i$ down into contact with the lower disk or plate $h$, imparting rotary motion thereto, and consequently winding the web E E' about the shaft D'.

If the indicator or pointer $u$ be left at the notation or index "Slow," the friction disk or wheel $i$ will act upon the disk $h$ near its periphery, and consequently will impart a comparatively slow motion to the disk and its attached shaft. If, however, it be desired that the webs be wound up more rapidly, all that it is necessary to do is to move the indicator about until it comes opposite the word "Fast," when the friction-wheel will be moved near the center of the friction-disk, and consequently will impart a greater or more rapid speed thereto.

By moving the pointer, and consequently rotating the controlling-shaft $s$ either to the right or the left of the word "Stop," the friction-wheel will be brought into contact with one or the other of said friction-disks $h$ near its periphery or near its center. From this it will be seen that the person desiring to use the directory is enabled to cause the bands or webs to be moved in one or the other direction, as occasion may require, and this at a varying rate of speed without any attention on the part of the operator other than merely moving the knob.

Figures 6, 7:
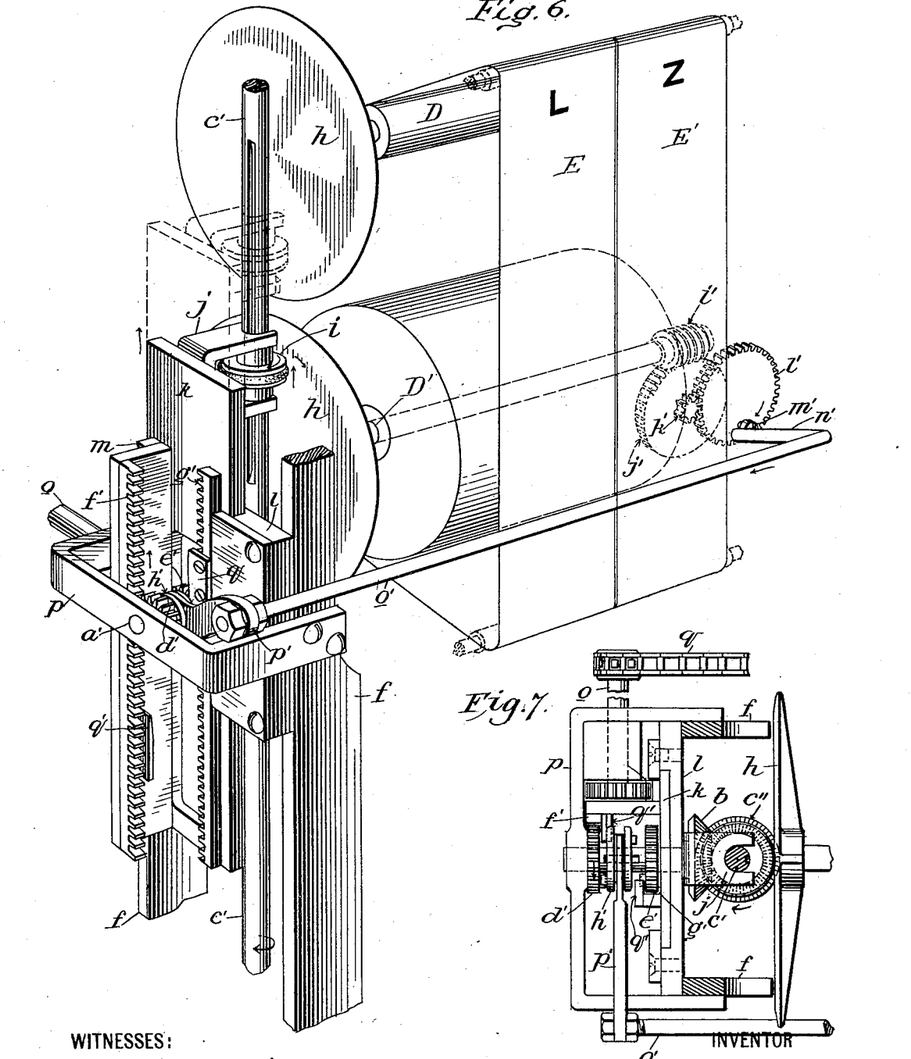

It is conceivable that in the use of the apparatus one may neglect to bring the pointer or indicator to its normal position or, in other words, to the position where the friction-wheel would be intermediate the disks $h$ $h$, and in view of this and the fact that the webs might inadvertently be wound entirely upon one roller before the operator could stop the action thereof it becomes incumbent to provide means for automatically shifting the position of the friction-wheel $i$. To this end I have devised a mechanism which will automatically shift the friction-wheel. Said mechanism is shown most clearly in Figs. 2, 3, 6, and 7. Frame $k$ is, as will be noted upon reference to Figs. 3 and 6, provided with an opening extending lengthwise thereof. A shaft $a'$ extends through this opening, the outer end thereof being supported in the bracket or cross-bar $p$. The inner end of said shaft carries a bevel-pinion $b'$, which is in mesh with a similar pinion $c''$, mounted on the upright shaft $c'$. Inasmuch as said shaft $c'$ is constantly rotated, shaft $a'$ will likewise be constantly rotated. Loosely mounted upon the shaft $a'$ are pinions $d'$ $e'$, the pinion $d'$ meshing with a rack $f'$ and pinion $e'$ meshing with a rack $g'$, both of said racks being attached to the sliding frame $k$. A two-faced sliding clutch $h'$ is mounted upon the shaft $a'$ and may be brought into engagement with one or the other of said pinions, as desired, or may occupy a position intermediate of the two. Normally the clutch will stand in the intermediate position out of operative relation with the pinions $d'$ and $e'$.

The outer end of the shaft $D'$ is provided with a worm $i'$, which drives a worm-gear $j'$, a small pinion $k'$ being mounted on the same shaft as the worm-gear and imparting motion to a larger gear $l'$ adjacent thereto. Said gear $l'$ carries a pin or stud $m'$, which under certain conditions comes into contact with one or the other face of the inwardly-projecting finger $n'$, formed upon the end of a rod $o'$, which extends across to the opposite side of the apparatus in line with the clutch $h'$. Said rod has attached to it a shifter arm or yoke $p'$, which engages the clutch $h'$ and moves the same in the following manner:

In Fig. 6 the main directory-webs are shown as entirely wound upon the lower roller, under which condition the worm $i'$ will have rotated the worm-wheel and the connected gears to such an extent as to bring the stop-pin carried by the gear $L'$ into contact with the finger $n'$, moving the bar $o'$ in the direction indicated by the arrow, and consequently moving the clutch $h'$ over into engagement with the pinion $d'$, causing said pinion to rotate with the clutch member, and consequently elevate the frame $k$ through the action of the pinion upon the rack $f'$. The upward movement of the frame will of course carry the yoke $j$ and the friction-wheel $i$ upwardly out of engagement with the friction or driving disk $h$ of the lowermost shaft or roller $D'$. As the friction-wheel moves out of contact with the disk no further movement or rotary motion will be imparted to the main shaft $B'$. If the frame continues its upward movement and the friction-wheel $i$ is carried into contact with the upper friction-disk $h$, the web will be wound in the reverse direction around the upper roller $D$.

In order to prevent an overthrow or too great a movement of the frame in either direction, there are provided clutch-shifting devices, which work in conjunction with the racks $f'$ $g'$. In the form illustrated these devices comprise simply a wedge-shaped plate $q'$, the plates being so positioned that as the frame is moved up or down a predetermined distance one or the other of said plates will come into contact with the clutch and throw it out of engagement with the pinion with which it is at that time working, thereby arresting any further upward or downward movement, as the case may be.

From the foregoing description it will be seen that the apparatus is automatic throughout and that all that it is necessary for the user of the apparatus to do is to turn the knob or handle in one or the other direction in order that any particular name may be brought to view. In practice, as set forth in my previous application before alluded to, it is designed to have the main webs $E$ $E'$ carry the general index, while the webs directly above are designed to carry the supplements and corrections or changes which may be necessary or occur from time to time. The index webs or bands will of course need no change under ordinary circumstances, and the same is true of the street-directory band or web and to a greater or less extent of the classified directory-bands. As before noted, the driving connections between the parts are such that the main index-webs will travel at a greater speed than any of the others, and the index bands or webs and the supplement bands or webs will be moved at a proper speed in order to have the various letters of the alphabet appear at the proper time before the various openings. The index-strips moving much slower than the main directory-strips can be readily seen by the user, and as the desired name is approaching the inspection-opening the apparatus must be slowed down in order that it may be promptly stopped when the desired name comes in line with the main inspection-opening 1.

While I have shown and described an arrangement by which the various webs may all be operated in unison, still it is not essential to the apparatus that all of them be employed. Ordinarily the main directory-webs, the supplement-webs, and the index-webs may be employed alone. The other webs, however, give the apparatus a wider range of usefulness. It is not desired to limit the invention to the precise details of construction shown herein, as it will readily be understood by those skilled in the art that the form of gear and the driving connections between the parts may be varied without departing from the spirit of the invention.

While two bands have been shown as employed for the main directory-webs and likewise two for the index and supplement, it will be readily seen that but one web need be employed for each of these and the operation of the machine will be the same. However, with the two webs placed side by side shorter webs may be employed and the particular name desired may be more quickly brought to view and with but a comparatively short movement of the webs.

Having thus described my invention, what I claim is—

1. In an apparatus of the character described, the combination of a pair of shafts; a web extending from one to the other of said shafts and adapted to be wound about and from said shafts in reverse directions; a disk secured to the end of each of said shafts; a continuously-rotating shaft mounted in line with the faces of said disks; a friction-wheel slidably mounted upon said shaft and rotating therewith; and means controllable from without the apparatus for shifting the wheel upon the rotatable shaft to bring it into contact with one or the other of the disks, substantially as described.

2. In an apparatus of the character described, the combination of a pair of shafts; a web extending from one to the other of said shafts and adapted to be wound about and from said shafts in reverse directions; a disk carried by each of said shafts; a shaft extending past the faces of said disks; a friction-wheel slidably mounted upon said shaft; means for bringing said wheel into operative relation with one or the other of said disks; and means for automatically shifting said wheel when the entire web has been nearly wound around one of said web-carrying shafts.

3. In an apparatus of the character described, the combination of a pair of shafts; a web extending from one to the other of said shafts and adapted to be wound about and from said shafts in reverse directions; means controllable from without the apparatus for causing one or the other of said shafts to be rotated; and means operated by the rotation of one of the shafts for stopping the rotation of the shafts when the web has been wound about the same a predetermined distance.

4. In an apparatus of the character described, the combination of a pair of shafts; a web extending from one to the other thereof and adapted to be wound about and from said shafts in reverse directions; a friction-disk carried by the end of each of said shafts; a third shaft mounted in line with the faces of said disk; a friction-wheel slidably mounted on said shaft; means for rotating the shaft; and means controllable from without the apparatus for moving the wheel into contact with one or the other of said disks and to position the same with reference thereto, whereby the speed of rotation of the web-carrying shafts may be regulated and determined.

5. In an apparatus of the character described, the combination of a pair of shafts; a web extending from said shafts and arranged to be wound about and from the same in reverse directions; disks carried by the ends of each of said shafts; a third shaft mounted in line with the faces of said disks; a friction-wheel slidably mounted upon said shaft; means for determining the position of said wheel upon the shaft and its relation to the disks; and means for maintaining the wheel in proper frictional contact with the disks.

6. In an apparatus of the character described, the combination of a pair of shafts; a web extending from one to the other of said shafts; a friction-disk carried by the end of each of said shafts; a third shaft mounted in line with the faces of said disks; a friction-wheel slidably mounted upon said shaft; means for continuously operating said shaft; means controllable from without the apparatus for positioning the friction-wheel with relation to the disks; and means for automatically shifting the position of the wheel when the web has traversed a predetermined distance in one or the other direction.

7. In an apparatus of the character described, the combination of a pair of shafts; a web connected to said shafts and arranged to be wound about and from the same in reverse directions; a disk connected to the end of each of said shafts; a third shaft extending parallel to the faces of said disk; means for continuously rotating said shaft; a friction-wheel slidably mounted upon said shaft; a sliding frame mounted adjacent to the shaft and in operative connection with the friction-wheel; means controllable from without the machine for raising or lowering the frame and thereby bringing one or the other of the disks into operative relation with the friction-wheel; and connections substantially such as described between the frame and one of the shafts for automatically shifting the position of the frame when the entire web is substantially wound about one of the web-carrying shafts.

8. In an apparatus of the character described, the combination of a pair of shafts; a web connected thereto and arranged to be wound about and from said shafts in reverse directions; a disk carried by the end of each of said shafts; a third shaft extending parallel to the faces of said disks; means for rotating said shaft; a friction-wheel slidably mounted upon said shaft; a frame mounted in suitable bearings adjacent to the shaft; means controllable from without the apparatus for shifting the position of the frame to bring the wheel into contact with one or the other of said disks; a pair of racks carried by said frame; a counter-shaft driven from the rotating shaft; pinions loosely mounted on said shaft and in engagement with the racks of the frame; a clutch slidably mounted upon said counter-shaft and rotating therewith; and connections between said clutch and a moving part of the apparatus to shift the clutch into operative connection with one or another of said pinions when the web has been practically wound about one of said web-carrying rolls.

9. In an apparatus of the character described, the combination of a pair of shafts; a web extending from one to the other of said shafts and arranged to be wound about and from said shafts in reverse directions; a disk carried by the outer end of each of said shafts; a third shaft extending parallel to the faces of said disks; means for positively rotating said shaft; a friction-wheel slidably mounted upon said shaft; a frame mounted in suitable bearings and moving parallel with the length of said third shaft; a rack mounted on the frame; a pinion engaging said rack; connections substantially as described extending to the outer portion of the apparatus and under the control of the user to actuate said pinion and thereby to elevate or depress the frame; a second pair of racks also connected to the frame; a counter-shaft extending through an opening in the frame in line with said pair of racks; driving connections intermediate said counter-shaft and the main driving-shaft; pinions loosely mounted on said counter-shaft and in operative connection one with each of said pair of racks; a sliding clutch mounted on the counter-shaft; a shifter for said clutch adapted and arranged to move said clutch into operative connection with one or the other of said pinions; connections intermediate said shifter and one of the web-carrying shafts; and clutch-releasing devices carried by the frame to release the clutch when the frame has been elevated or depressed to the required degree.

10. In an apparatus of the character described, the combination of a pair of shafts; a pair of webs extending from one to the other of said shafts and arranged to be wound about and from said shafts in reverse directions; means for positively rotating one or the other of said shafts; a second pair of shafts; a pair of webs connected to said shafts; driving connections intermediate said second pair of shafts and one of said first pair, said connections being such that the second pair of shafts is driven at a relatively low speed; a third pair of shafts; a third set of webs connected to said shafts; driving connections between said third pair of shafts and the first pair of shafts; and a fourth pair of webs connected to spools sustained and rotated by the outer ends of said third pair of shafts, substantially as described.

In testimony whereof I have signed my name to this specification in the presence of two subscribing witnesses.

GEORGE W. MAXWELL.

Witnesses:
E. S. PILLARD,
E. W. MAXWELL.